United States Patent [19]
Wolfe

[11] 4,392,680
[45] Jul. 12, 1983

[54] SPREADER SAFETY DEVICE

[76] Inventor: Hunter Wolfe, 121 Yardley Ave., Fallsington, Pa. 19054

[21] Appl. No.: 353,943

[22] Filed: Mar. 2, 1982

Related U.S. Application Data

[63] Continuation-in-part of Ser. No. 110,815, Jan. 10, 1980, abandoned.

[51] Int. Cl.³ .......................... B66C 1/34; F16G 11/00

[52] U.S. Cl. ................................. 294/78 R; 24/122.6; 294/100

[58] Field of Search .................... 294/16, 27 R, 28, 33, 294/66 R, 74, 78 R, 79, 80, 82 R, 86 R, 100, 106, 115, 116; 24/115 R, 115 G, 115 H, 115 J, 115 M, 122.6, 129 R, 129 A, 136 R, 136 L, 251

[56] References Cited

U.S. PATENT DOCUMENTS

| | | | |
|---|---|---|---|
| 305,653 | 9/1884 | Anthony | 294/33 |
| 328,350 | 10/1885 | Smith | 294/74 |
| 626,350 | 6/1899 | Tiffany | 294/78 R |
| 917,738 | 4/1909 | Opsal | 294/74 |
| 1,271,435 | 7/1918 | Cloutier | 294/82 R |
| 1,298,702 | 4/1919 | Harshaw | 294/100 X |
| 1,894,389 | 1/1933 | Zapf | 24/122.6 X |
| 2,573,216 | 10/1951 | Natoli | 294/78 R |
| 2,581,799 | 1/1952 | Kramer | 294/100 |
| 3,307,870 | 3/1967 | Archer | 294/74 |
| 3,605,202 | 9/1971 | de Valenzuela | 24/122.6 |

FOREIGN PATENT DOCUMENTS

| | | | |
|---|---|---|---|
| 116132 | 11/1942 | Australia | 294/74 |
| 515905 | 12/1939 | United Kingdom | 294/74 |
| 239835 | 7/1969 | U.S.S.R. | 24/115 M |

*Primary Examiner*—Johnny D. Cherry
*Attorney, Agent, or Firm*—Hopgood, Calimafde, Kalil, Blaustein & Judlowe

[57] ABSTRACT

A spreader safety device is herein disclosed which has a ring like member having outwardly flared portions extending toward the axial ends thereof. The ring is sized so as to slidably fit over the spreader attachment element and the spreader cables. However, the ring is further sized to be sufficiently small so as to not slide over the gripping hooks attached to the free ends of the spreader. Accordingly, the ring slides into abutting contact with such hooks. The flared out portions of the ring generally describe two truncated cones very much resembling an hour glass. In operation, when the spreaders are separated for connection with the outside of an object to be hoisted, the safety device slides up the spreaders. When the hooks are then removed from the object and permitted to swing toward each other, the ring immediately falls into abutting engagement with the hooks so as to prevent excessive pendulum swinging of the spreaders and, hence, injury to any personnel standing in the vicinity of the spreaders.

5 Claims, 5 Drawing Figures

SPREADER SAFETY DEVICE

CROSS REFERENCE TO RELATED APPLICATIONS

This application is a continuation-in-part of my application Ser. No. 110,815 filed Jan. 10, 1980, entitled "Spreader Safety Device", now abandoned.

BACKGROUND OF THE INVENTION

The present invention relates to a safety device and, in particular, to a safety device for preventing injury or damage caused by the pendulum swinging of hoist spreaders upon the release of such spreaders from the object which has been hoisted.

Essentially, spreaders are generally cables or chains depending from the ring or the like at the top ends thereof and provided with large hooks at the bottom ends thereof for gripping engagement with the object to be hoisted.

A hoisting crane is attached to the spreaders by a hoisting line and the hooks are positioned in gripping engagement with an object to be lifted.

After the object has been hoisted and lifted to a desired location, the hooks are disengaged from the object and, many times, are permitted to swing like pendulums in a very dangerous fashion.

Such spreaders often present a length of approximately 30 feet and are provided with hooks that have substantial weight. The objects hoisted by such spreaders often are as wide as 50 or 60 feet. Consequently, when the spreaders are released from such an object and permitted to swing through their 30 foot lengths, substantial property damage or personal injury may be sustained as a result of the impact of the hooks.

OBJECTS AND SUMMARY OF THE INVENTION

It is therefore an object of the present invention to provide a safety device for preventing personal injury or property damage as a result of the pendulum swinging of spreaders released from an object which has been hoisted.

It is another object of the present invention to provide a safety device for spreaders which safety device is simple in operation and manufacture.

It is another object of the present invention to provide a safety device for spreaders which safety device operates automatically.

It is yet still a further object of the present invention to provide a safety device for spreaders which will not interfere with the hoisting operation for which the spreaders are being used.

At least some of the above objects are achieved by the provision of a safety device for use in combination with a plurality of spreaders. The safety device may comprise a ring like member being sized sufficiently large to freely slide over the plurality of spreaders and being formed with surfaces which generally flare outwardly toward one axial end of the ring like member. As a result of the outwardly flared surfaces, the spreaders force the ring like member to slide along the spreaders from one end to the other upon a separation of the spreaders from each other.

In one feature of the invention, the ring like members may be formed with surfaces generally flaring outwardly toward both axial ends thereof.

In still another feature of the invention, the ring may be sized sufficiently large to freely slide along the spreaders but sized sufficiently small to abutt against hook members attached to a lower end of the spreaders when the spreaders are not in gripping engagement with an object.

In yet another feature of the invention, the safety ring is further sized sufficiently large to fit over a hoist attachment member from which the spreaders depend.

Another feature of the invention contemplates that the ring be formed of a mass having a weight at least equal to the weight of the hooks attached to the spreader cables.

Another feature contemplates that the device include an inner jamb block for guiding the spreader cables.

The invention further contemplates a combination of the above described safety device with the spreaders as an overall mechanism.

DESCRIPTION OF THE DRAWINGS

While the invention is particularly pointed out and distinctly claimed in the concluding portion of the application, the preferred embodiment of the present invention may be best understood by reference to the accompanying drawings in which:

DETAILED DESCRIPTION

Figure 1:
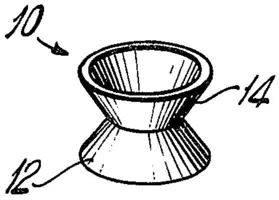
FIG. 1 shows a spreader safety device according to the present invention.

Referring to the drawings in which like numerals are used to indicate like parts throughout the various views thereof, FIG. 1 shows a spreader safety collar in accordance with the present invention.

The collar 10 may generally comprise a ring like member having at least one surface 12 which is formed to flare outwardly toward one end thereof. For ease of operation, the collar may have a second surface 14 which is likewise formed to flare outwardly toward an axial end of the collar.

In this double flared configuration, the collar very closely resembles an hour glass configuration.

Figure 2:
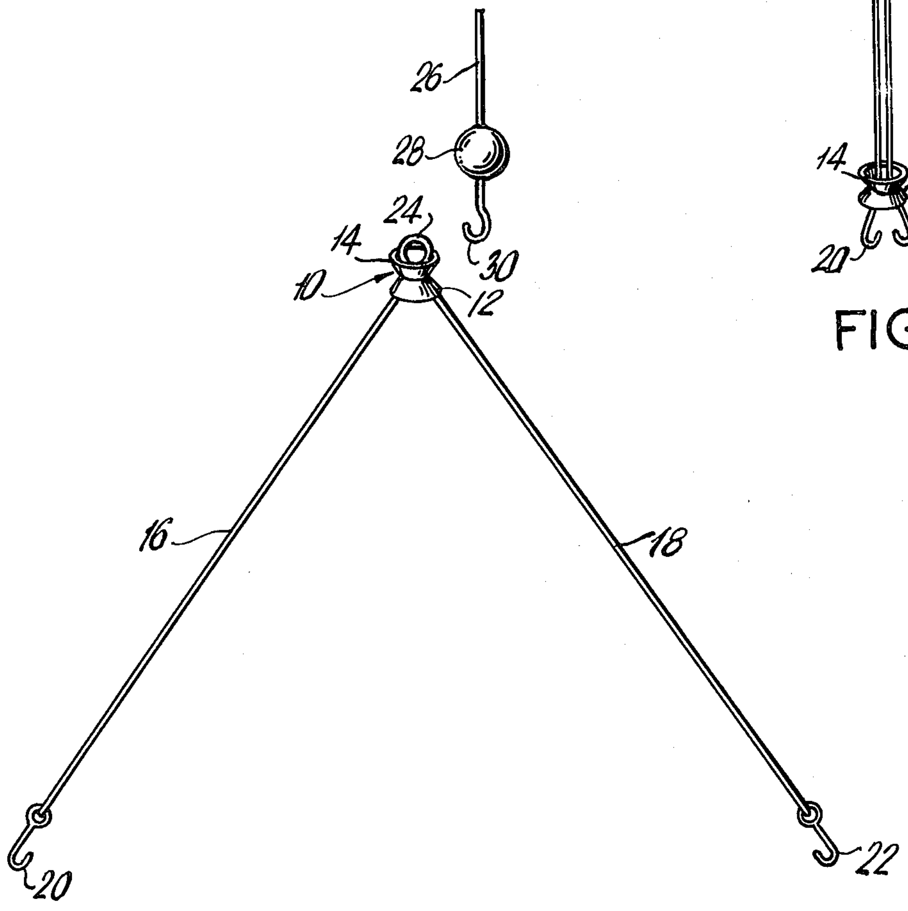
FIG.2 shows the safety device of the present invention in an operational posture in combination with spreaders which have been drawn apart for attachment to an object to be hoisted.

Referring now to FIG. 2, the collar of FIG. 1 is shown in an operational posture whereby the collar 10 is slidably engaged over two or more spreaders 16 and 18. The spreaders 16 and 18 are provided at the lower end thereof with object gripping members such as hooks 20 and 22.

The spreaders 16 and 18 depend from their upper ends from an attachment member 24 which may be a ring or the like for attachment to a hoist line 26.

Typically, the hoist line will have a weight 28 and a hook or the like 30 for engagement within the hoist attachment member or ring 24.

Figure 3:
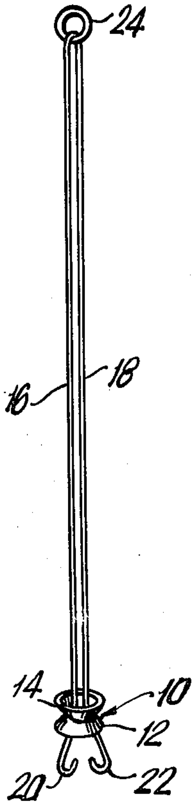
FIG. 3 shows a ring and spreader combination wherein the spreaders have been released from an object and the hooks thereof are contained by the abutting engagement of the spreader safety device.

The annular size of the collar 10 at its most narrow cross-sectional profile is to be sufficiently large to freely slide along the plurality of spreaders 16 and 18 but yet sufficiently small so as to not slide over the hooks 20 and 22. For example, see FIG. 3 where the collar 10 is in an abutting relationship with the hooks 20 and 22.

Preferably, the collar 10 is further sized so as to freely slide over the hoist attachment member 24.

In operation, when the hooks 20 and 22 are drawn apart as shown in FIG. 2 for engagement with the edges of an object to be hoisted, the collar automatically slides upwardly and away from the object so as to not interfere with the object gripping step. The flared portion 12 facilitates the automatic upward sliding of the collar.

When the hooks 20 and 22 have been removed from the object and are permitted to swing toward each other, as would be the natural result of releasing the hooks (see FIG. 2), collar 10 slides downwardly under the influence of gravity into abutting relationship with the hooks 20 and 22.

Preferably, the mass of the material comprising the collar 10 is of a weight at least equal to the combined weights of the hooks 20 and 22.

Figure 4:
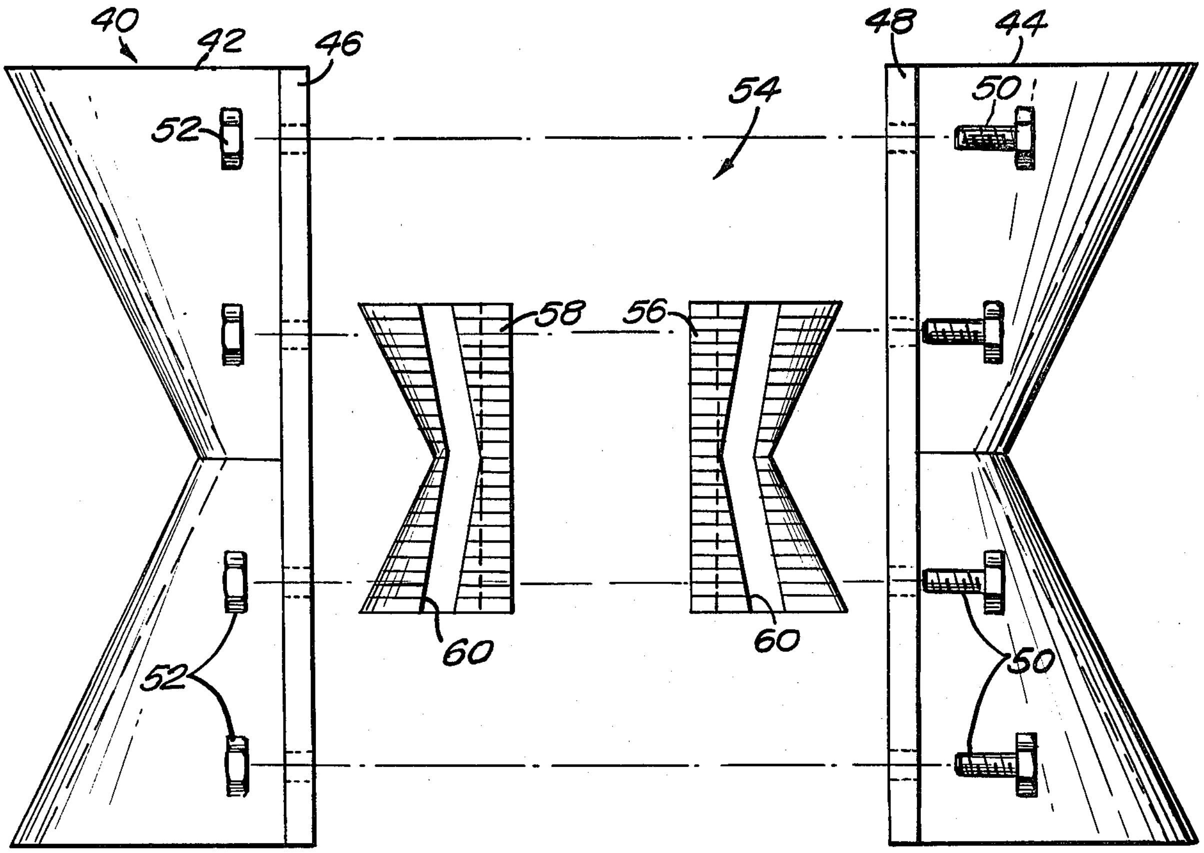
FIG. 4 is an exploded view of the safety device of the present invention formed from two halves and including a centrally disposed jamb block.

FIG. 4 illustrates another embodiment of a spreader safety device which includes a centrally disposed jamb block. A collar 40 is comprised of a first half 42 and a second half 44. Collar half 42 has a flange 46 and collar half 44 has a flange 48. Suitable fastening means such as bolts 50 and nuts 52 are used to join halves 42, 44 together. When halves 42, 44 are joined together, collar 40 generally has the configuration of collar 10 previously described. However, collar 40 includes a centrally disposed jamb block 54 comprised of halves 56, 58.

Figure 5:
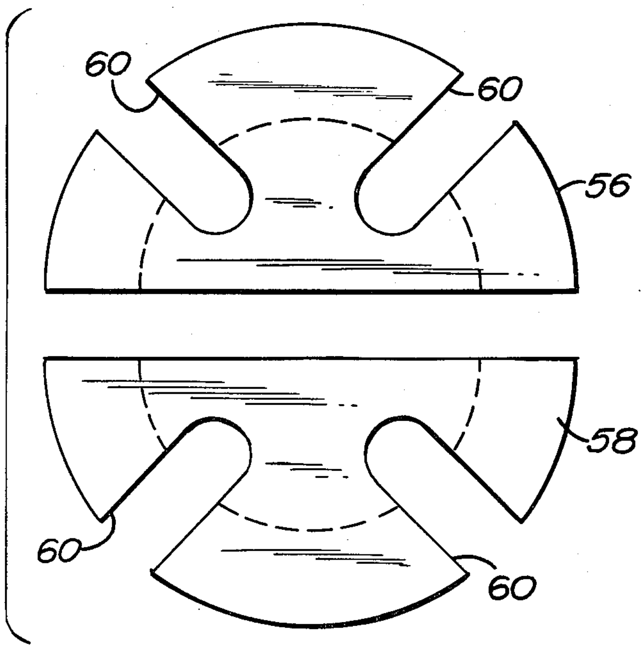
FIG. 5 is a top plan view of the jamb block of FIG. 4.

Jamb block 54 may be formed as either a single piece or a two-piece arrangement as shown in FIGS. 4 and 5. Jamb block 54 has the same hour glass configuration as does collar halves 42, 44 but is shorter so that it may be centrally disposed therein. Each jamb block half, 56, 58 includes slots 60 cut in its outer periphery through which the hoisting cables are run. As illustrated, jamb block halves 56, 58 each have two slots 60 so that four cables may be accommodated.

Slots 60 serve to keep the cables from tangling both in use and when not attached to the item to be lifted. Thus, spreader safety device 40 with its internally mounted jamb block 56 not only provides the safety features previously described with respect to collar 10, but prevents tangling of the cables as well. The number of slots 60 may be varied depending on the cabling required. Additionally, it is not necessary that the cables run through every slot 60. For example, the two-cable arrangement, as shown in FIG. 2, need only fill two of the slots 60. The openings in jamb block 54 may be bored holes as well as slots 60. The width of the slot or holes is not critical, it is sufficient that they permit the cables to slide freely therein.

It can thus be seen that a very simple and automatic safety device has been herein described for preventing the uncontrollable pendulum swinging of spreaders which swinging, if unchecked, has been known to cause substantial property damage and/or personal injury.

While what has been shown herein is a preferred embodiment of the present invention, it is of course to be understood that various modifications and changes may be made therein without departing from the true spirit and scope of the present invention. For example, the collar member conceivably could be of a configuration other than an annular ring, i.e., the collar member could be formed by a connected series of flat surfaces closing on themselves much the same as a box with two opened ends. It is therefore intended to cover in the following claims of such modifications and changes as may fall within the scope of the invention.

What is claimed is:

1. A safety collar for use in combination with a plurality of spreader cables having object gripping members disposed on their terminal ends:

said safety collar being formed as an annular member formed as generally truncated cones flaring outwardly towards both ends, said safety collar being freely slideable over said plurality of cables but sized sufficiently small so that it will not pass over said object gripping members;

a jamb block centrally disposed in said safety collar, said jamb block having a plurality of openings corresponding in number to the number of said cables, each of said openings having a diameter of sufficient size to permit said cables to freely slide therethrough; and upon the separation of said plurality of cables, when said gripping means are attached to an object, said safety collar being urged upwardly along said cables and when said gripping members are not attached to an object, said collar being urged downwardly by the action of gravity to prevent said cables and said gripping members from swinging.

2. A safety collar according to claim 1, wherein said safety collar is formed of a mass having a weight which is at least equal to the combined weights of said object gripping members.

3. A safety collar according to claim 1, wherein said collar is formed from first and second halves, said halves being joined along a plane parallel to the longitudinal centerline of said collar.

4. A safety collar according to claim 1, wherein said jamb block is formed from two halves, said halves being joined along a plane parallel to the longitudinal axis of said jamb block.

5. A safety collar as claimed in claim 1, wherein said spreader cables depend from a hoist attachment member and said safety collar is sized so that it is fittable over said hoist attachment member.

* * * * *